UNITED STATES PATENT OFFICE.

FRANZ SCHNELL, OF GUTENSTEIN, AUSTRIA-HUNGARY.

WOOD SUBSTITUTE.

No. 900,686.

Specification of Letters Patent.

Patented Oct. 6, 1908.

Application filed May 2, 1907. Serial No. 371,513.

*To all whom it may concern:*

Be it known that I, FRANZ SCHNELL, a subject of the Emperor of Austria-Hungary, residing at Gutenstein, in Lower Austria, have invented certain new and useful Improvements in Wood Substitutes; and I do hereby declare the following to be a full, clear, and exact description of the invention, such as will enable others skilled in the art to which it appertains to make and use the same.

My invention relates to a new and useful composition of matter and has for its object to provide a substitute for wood having a lower specific gravity than and possessing all the technical properties of wood.

My composition consists of the following ingredients, combined in substantially the proportions stated, viz:

| | |
|---|---|
| Cereal flour | 40 per cent. |
| Wood dust | 59 per cent. |
| Fiber | 1 per cent. |

A dough is formed of the flour of cereals by the addition of water; in this dough the wood dust and fiber are mixed in a cold state and the mass molded and hardened. The binding power of the gluten contained in the flour of cereals imparts to the composition a sufficient degree of coherence. After the molding and hardening of the composition it can be turned, carved, smoothed and polished as readily as natural wood.

If it is intended to protect the product against moisture chrome glue or resin size or the like are added to the mass, or the surface of the finished article is provided with a coating of such substance. In a similar manner a coloration of the product can be obtained either by admixing solutions of coloring matter to the composition or by impregnating or coating the finished articles with such solutions.

My composition is principally intended for the manufacture of small bobbins for thread, silk and the like. The advantages of the bobbins made of this composition as compared with the usual wood bobbins consists in that the former are much lighter, which involves an important economy in the exportation of thread, silk and the like as the customs duty is calculated by the gross weight.

I claim:

1. A process for the manufacture of wood substitute for the manufacture of turnery ware, consisting in making a thick magma by mixing flour from cereals with water and adding to this magma a large quantity of wood dust and a very small quantity of a fibrous material, the said process yielding a composition of a very low specific gravity.

2. A composition suitable for use as a substitute for wood comprising flour from cereals, wood dust and a small quantity of fibrous material.

3. A composition suitable for use as a substitute for wood and composed of 40% of flour from cereals, 59% of wood dust and 1% of fibrous material.

4. A composition suitable for use as a wood substitute, comprising flour of cereals, wood dust, fibrous material and chrome glue.

In testimony that I claim the foregoing as my invention, I have signed my name in presence of two subscribing witnesses.

FRANZ SCHNELL.

Witnesses:
  JOSEF RUBASCH,
  ALVESTO S. HOGUE.